United States Patent
Zhang et al.

(10) Patent No.: US 11,855,537 B2
(45) Date of Patent: Dec. 26, 2023

(54) SWITCHING CONVERTERS WITH ADAPTIVE CONSTANT ON-TIME CONTROL AND CONTROL METHODS THEREOF

(71) Applicant: Chengdu Monolithic Power Systems Co., Ltd., Chengdu (CN)

(72) Inventors: Jian Zhang, Chengdu (CN); Xingwei Wang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 150 days.

(21) Appl. No.: 17/541,920

(22) Filed: Dec. 3, 2021

(65) Prior Publication Data

US 2022/0190722 A1 Jun. 16, 2022

(30) Foreign Application Priority Data

Dec. 10, 2020 (CN) .......................... 202011462533.3

(51) Int. Cl.
*H02M 3/158* (2006.01)
*H02M 1/00* (2006.01)

(52) U.S. Cl.
CPC ......... *H02M 3/158* (2013.01); *H02M 1/0032* (2021.05)

(58) Field of Classification Search
CPC ................. H02M 1/0032; H02M 3/155–1588
See application file for complete search history.

(56) References Cited

U.S. PATENT DOCUMENTS

| | | |
|---|---|---|
| 10,020,734 B2 | 7/2018 | Zhong |
| 10,348,111 B2 | 7/2019 | Xu et al. |
| 10,666,272 B2 | 5/2020 | Li |
| 2014/0035654 A1* | 2/2014 | Jiang ...................... H03K 17/16 327/365 |
| 2014/0084885 A1* | 3/2014 | Ouyang ................ H02M 3/158 323/271 |
| 2021/0203230 A1 | 7/2021 | Li |
| 2021/0242774 A1* | 8/2021 | Yun ..................... H02M 1/0032 |

* cited by examiner

*Primary Examiner* — Peter M Novak
(74) *Attorney, Agent, or Firm* — Perkins Coie LLP (57) ABSTRACT

A switching converter with adaptive constant on-time control has a power switch and a control circuit. The switching converter converts an input voltage into an output voltage. When the switching converter is in a light-load state, the on-time of the power switch is controlled to be smaller than the on-time of the power switch in a normal-load state, wherein the normal-load state includes a continuous current mode (CCM) or a discontinuous current mode (DCM).

17 Claims, 7 Drawing Sheets

SWITCHING CONVERTERS WITH ADAPTIVE CONSTANT ON-TIME CONTROL AND CONTROL METHODS THEREOF

CROSS-REFERENCE TO RELATED APPLICATIONS

This application claims the benefit of CN application 202011462533.3, filed on Dec. 10, 2020, and incorporated herein by reference.

TECHNICAL FIELD

The present invention generally relates to electronic circuits, and more particularly but not exclusively to switching converters with adaptive constant ON-time control, control circuits and control methods thereof.

BACKGROUND

Constant ON-time (COT) control is widely used in switching converters because of its simple control loop and fast dynamic response. Traditionally, the COT control is a variable frequency control method, the on-time of a switch is constant, and an output voltage is regulated by controlling the duty cycle of the switch. Wherein the on-time of the switch only can be adjusted to respond to the load transient. When the system enters a new steady state again, the on-time of the switch keeps constant, and is still equal to the on-time of the switch before the load transient.

In some applications, a small size inductor is used to improve transient performance, reduce size and prevent an output overshoot. However, since the on-time of the switch stays unchanged in the aforementioned switching converters, using the small size inductor will result in a high output voltage ripple when the system enters a light-load steady state. Therefore, it is desired to provide a switching converter with an improved COT control that can provide good transient performance and low light-load output voltage ripple when the small size inductor is used.

SUMMARY

The embodiments of the present invention are directed to a control circuit used in a switching converter, wherein the switching converter has a power switch and converts an input voltage into an output voltage, the control circuit comprising: a light-load regulating current generator, an on-time control circuit, a comparing circuit and a logic circuit. The light-load regulating current generator is configured to receive a state indication signal indicative of a light-load state, and generate a light-load regulating current signal based on the state indication signal. The on-time control circuit is configured to receive the light-load regulating current signal and generate an on-time control signal based on the light-load regulating current signal, wherein based on the on-time control signal, the on-time of the power switch in the light-load state is controlled to be smaller than the on-time of the power switch in a normal-load state. The comparing circuit is configured to receive a feedback voltage signal indicative of the output voltage and a reference voltage signal, and generate a comparing signal based on the feedback voltage signal and the reference voltage signal. The logic circuit is configured to receive the comparing signal and the on-time control signal, and generate a switch control signal to control the power switch based on the comparing signal and the on-time control signal.

The embodiments of the present invention are directed to a switching converter comprising: a switching circuit, a feedback circuit, a light-load regulating current generator, an on-time control circuit, a comparing circuit and a logic circuit. The switching circuit has a power switch and is configured to convert an input voltage into an output voltage. The feedback circuit is coupled to the switching circuit and configured to provide a feedback voltage signal indicative of the output voltage. The light-load regulating current generator is configured to receive a state indication signal indicative of a light-load state and generate a light-load regulating current signal based on the state indication signal. The on-time control circuit is configured to receive the light-load regulating current signal and generate an on-time control signal based on the light-load regulating current signal, wherein based on the on-time control signal, the on-time of the power switch in the light-load state is controlled to be smaller than the on-time of the power switch in a normal-load state. The comparing circuit is configured to receive the feedback voltage signal and a reference voltage signal, and generate a comparing signal based on the feedback voltage signal and the reference voltage signal. The logic circuit is configured to receive the comparing signal and the on-time control signal, and generate a switch control signal to control the power switch based on the comparing signal and the on-time control signal.

The embodiments of the present invention are directed to a control method used in a switching converter, wherein the switching converter has a power switch and converts an input voltage into an output voltage, the control method comprises the following steps: 1) judging whether the switching converter is in a light-load state; 2) generating a light-load regulating current signal when the switching converter is in the light-load state; and 3) generating an on-time control signal based on the light-load regulating current signal, wherein based on the on-time control signal, the on-time of the power switch in the light-load state is controlled to be smaller than the on-time of the power switch in a normal-load state.

BRIEF DESCRIPTION OF THE DRAWING

The present invention can be further understood with reference to the following detailed description and the appended drawings.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
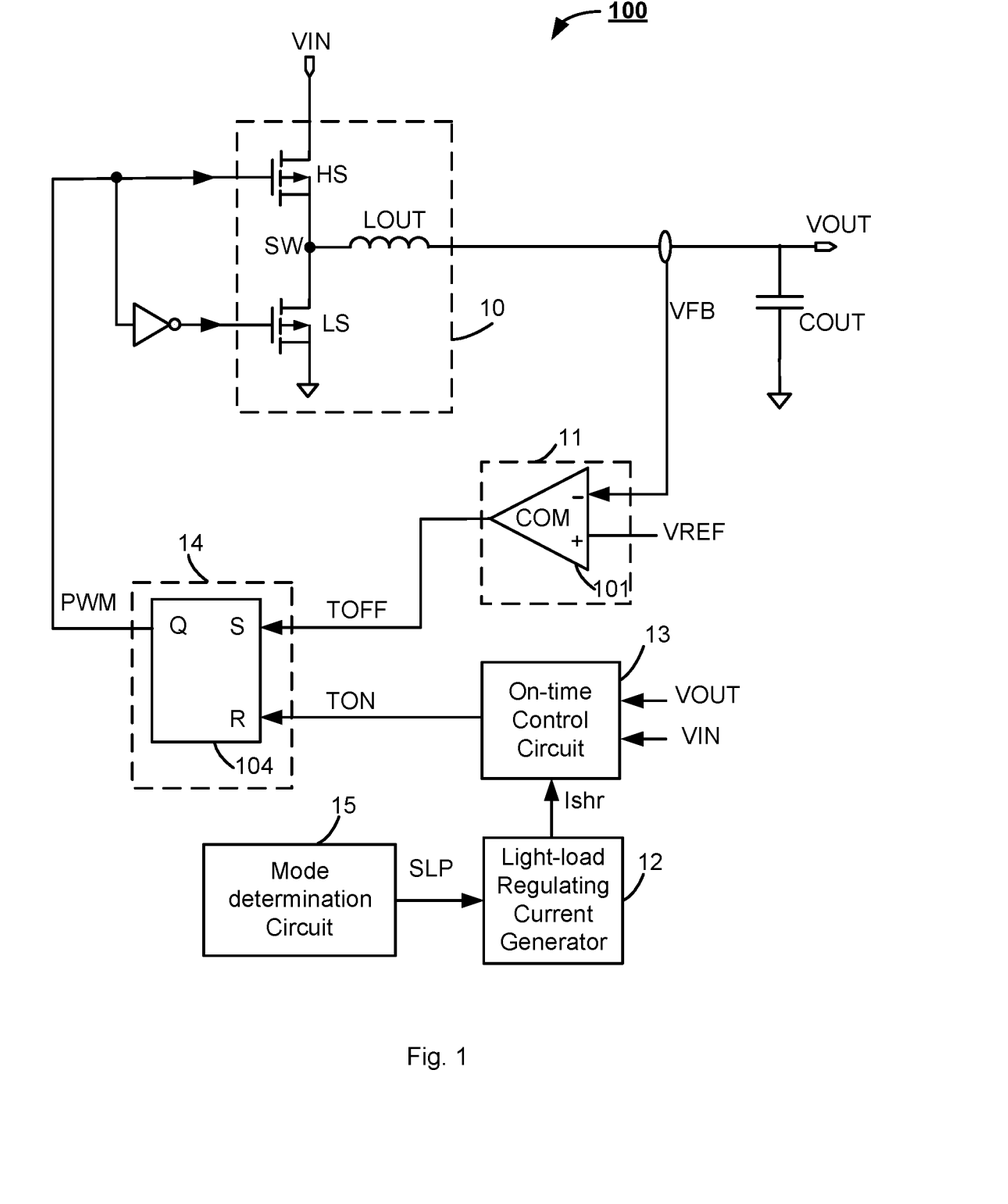
FIG. 1 illustrates a block diagram of a switching converter 100 with adaptive constant on-time control in accordance with an embodiment of the present invention.

FIG. 1 illustrates a block diagram of a switching converter 100 with adaptive constant on-time control in accordance with an embodiment of the present invention. As shown in FIG. 1, the switching converter 100 comprises a switching circuit 10 and a control circuit. The switching circuit 10 comprises a power switch controlled by the control circuit and converts an input voltage VIN into an output voltage VOUT by the turning on and turning off of the power switch. In the example shown in FIG. 1, the switching circuit 10 takes Buck topology as an example, and comprises a high side switch HS, a low side switch LS and an inductor LOUT, wherein the high side switch HS and the low side switch LS are both power switches. In other embodiment, the low side switch LS can be replaced by a diode. Those skilled in the art can understand that, the switching circuit 10 can be configured in other DC/DC or AC/DC topologies, such as synchronous or asynchronous Buck, Boost, Forward or Flyback converters. The power switches of the switching circuit 10 can be any controllable semiconductor device, such as MOSFET, IGBT, and so on.

The control circuit of the switching converter 100 comprises a comparing circuit 11, a light-load regulating current generator 12, an on-time control circuit 13, a logic circuit 14 and a mode determination circuit 15. In one embodiment, the comparing circuit 11, the light-load regulating current generator 12, the on-time control circuit 13, the logic circuit 14 and the mode determination circuit 15 can be fabricated in an integrated circuit (IC), such as an analog IC, digital IC or analog-digital IC.

In one embodiment, the comparing circuit 11 is configured to receive a feedback voltage signal VFB indicative of the output voltage VOUT. The comparing circuit 11 compares the feedback voltage signal VFB with a reference voltage signal VREF and generates a comparing signal TOFF. The comparing signal TOFF is a logic high/low signal. In one embodiment, when the comparing signal TOFF changes from logic low into logic high, a first power switch (e.g., the high side switch HS) of the switching converter 100 is turned on, a second power switch (e.g., the low side switch LS) is turned off. In one embodiment, the comparing circuit 11 comprises a voltage comparator 101 having a non-inverting terminal and an inverting terminal, wherein the non-inverting terminal receives the feedback voltage signal VFB and the inverting terminal receives the reference voltage signal VREF. When the feedback voltage signal VFB decreases to the reference voltage signal VREF, the comparing signal TOFF changes from logic low into logic high, the first power switch is turned on and the second power switch is turned off.

The light-load regulating current generator 12 is configured to generate a light-load regulating current signal Ishr when the switching converter 100 is in a light-load state. In one embodiment, the light-load regulating current generator 12 receives a state indication signal SLP and judges whether the switching converter 100 is in a light-load state or a normal-load state based on the state indication signal SLP. In one embodiment, the normal-load state is a normal loaded working state before the switching converter 100 entering the light-load state or after the switching converter 100 exiting the light-load state. In one embodiment, when the state indication signal SLP indicates the normal-load state, the light-load regulating current generator 12 is disabled. In one embodiment, when the state indication signal SLP indicates the normal-load state, the light-load regulating current signal Ishr is a zero current. In one embodiment, when the state indication signal SLP indicates the light-load state, the light-load regulating current generator 12 generates a constant light-load regulating current signal Ishr. In one embodiment, when the state indication signal SLP indicates the light-load state, the light-load regulating current generator 12 generates the light-load regulating current signal Ishr with the load change, wherein the load change refers that the load becomes lighter or heavier. In one embodiment, the lighter the load is, the higher the light-load regulating current signal Ishr is.

In the example shown in FIG. 1, the mode determination circuit 15 is configured to determine whether the switching converter 100 is in the light-load state and provide the state indication signal SLP indicating the light-load state. In one embodiment, the state indication signal SLP is a logic high/low signal, wherein the state indication signal SLP is at logic valid (e.g., logic high), indicates that the switching converter 100 is in the light-load state; and the state indication signal SLP is at logic invalid (e.g., logic low), indicates that the switching converter 100 is in the normal-load state. In practical applications, methods known in the art can be used to determine whether the switching converter 100 is in the light-load state, accordingly, the mode determination circuit 15 can also include additional or different components.

In one embodiment, the mode determination circuit 15 can determine whether the switching converter 100 enters the light-load state by monitoring the off-time of the high side switch HS. For example, when the high side switch HS is turned off, the mode determination circuit 15 starts timing. When a timing time reaches a first time threshold tTH1, the state indication signal SLP is logic valid.

In one embodiment, the mode determination circuit 15 can determine whether the switching converter 100 enters the light-load state by monitoring the off-time of the low side switch LS. For example, when the low side switch LS is turned off, the mode determination circuit 15 starts timing. When the timing time reaches a second time threshold tTH2, the state indication signal SLP is logic valid.

In another embodiment, the mode determination circuit 15 can also determine whether the switching converter 100 enters the light-load state by monitoring the period when the high side switch HS and the low side switch LS are both turned off. For example, when the high side switch HS and the low side switch LS are both turned off, the mode determination circuit 15 starts timing. When the timing time reaches a third time threshold tTH3, the state indication signal SLP is logic valid.

The on-time control circuit 13 is configured to receive the input voltage VIN, the output voltage VOUT and the light-load regulating current signal Ishr, and generate an on-time control signal TON to control the on-time of the power switches of the switching circuit 10 based thereupon. In one embodiment, based on the on-time control signal TON, the on-time of the power switches in the light-load state is controlled to be smaller than that in the normal-load state. In one embodiment, the on-time control signal TON is configured to control the on-time of the high side switch HS. In other embodiment, the on-time control circuit 13 is configured to only receive the light-load regulating current signal Ishr, and generate the on-time control signal TON based on the light-load regulating current signal Ishr and a constant voltage signal of the on-time control circuit 13. At this condition, the on-time control signal TON stays unchanged when the input voltage VIN and the output voltage VOUT change.

In one embodiment, when the switching converter 100 is in the normal-load state, based on the on-time control signal TON, the on-time of the power switches is controlled to be constant in a first normal-load steady state or a second normal-load steady state. In detail, when the switching converter 100 is in the normal-load state, the switching converter 100 enters the second normal-load steady state from the first normal-load steady state after load change, the on-time of the power switches during these two steady states are constant and equal. During the transient stage from the first normal-load steady state to the second normal-load steady state, the on-time of the power switches could change or stay unchanged. For example, in one embodiment, when the switching converter 100 is during the transient stage, the on-time of the power switches stays unchanged while the switching frequency is regulated to adapt the load change. In another embodiment, when the switching converter 100 is during the transient stage, the on-time of the power switches can change with the load change.

Those skilled in the art should understand that "steady state" of the switching converter 100 refers that in multiple switching cycles, the load stays unchanged, and a current waveform and a voltage waveform are repeated in each switching cycle. For example, assuming the switching cycle is T, then the current $i(nT)=i((n+1)T)$, the voltage $v(nT)=v((n+1)T)$. The current waveform and the voltage waveform are periodic waveforms. On the contrary, when the load changes or there is perturbation to the system, the transformation between two steady states is "transient state".

In one embodiment, when the state indication signal SLP indicates the light-load state, based on the on-time control signal TON, the on-time of the power switches in a light-load steady state is configured to be smaller than that in a normal-load steady state. In one embodiment, in the light-load state, the on-time of the power switches in a first light-load steady state or a second light-load steady state is configured to stay unchanged. In other words, in the light-load state, the switching converter 100 enters the second light-load steady state from the first light-load steady state after load change, the on-time of the power switches in the two different steady states are constant and equal. In another embodiment, in the light-load state, the on-time of the power switches in the first light-load steady state or the second light-load steady state is configured to change with load change. For example, in the light-load state, the lighter the load is, the smaller the on-time of the power switches is.

The logic circuit 14 is configured to receive the comparing signal TOFF and the on-time control signal TON and generate a control signal PWM based thereupon to control the power switches in the switching converter 100. In the example shown in the FIG. 1, the logic circuit 14 is a RS flip-flop 104. The RS flip-flop 104 has a set terminal S, a reset terminal R and an output terminal Q, wherein the set terminal S receives the comparing signal TOFF, the reset terminal S receives the on-time control signal TON and the output terminal Q provides the control signal PWM.

In one embodiment, the switching converter 100 further comprises a driving circuit (not shown). The driving circuit has an input terminal and an output terminals, wherein the input terminal is coupled to the output terminal of the logic circuit 14 and the output terminal is coupled to the control terminal of the power switches to control the power switches.

In one embodiment, in order to eliminate the sub-harmonic oscillation at the output voltage VOUT, the switching converter 100 further comprises a slope compensation circuit (not shown). The slope compensation circuit is configured to provide a slope compensation signal which can be added to the feedback voltage signal VFB, or be subtracted from the reference voltage signal VREF.

Figure 2:
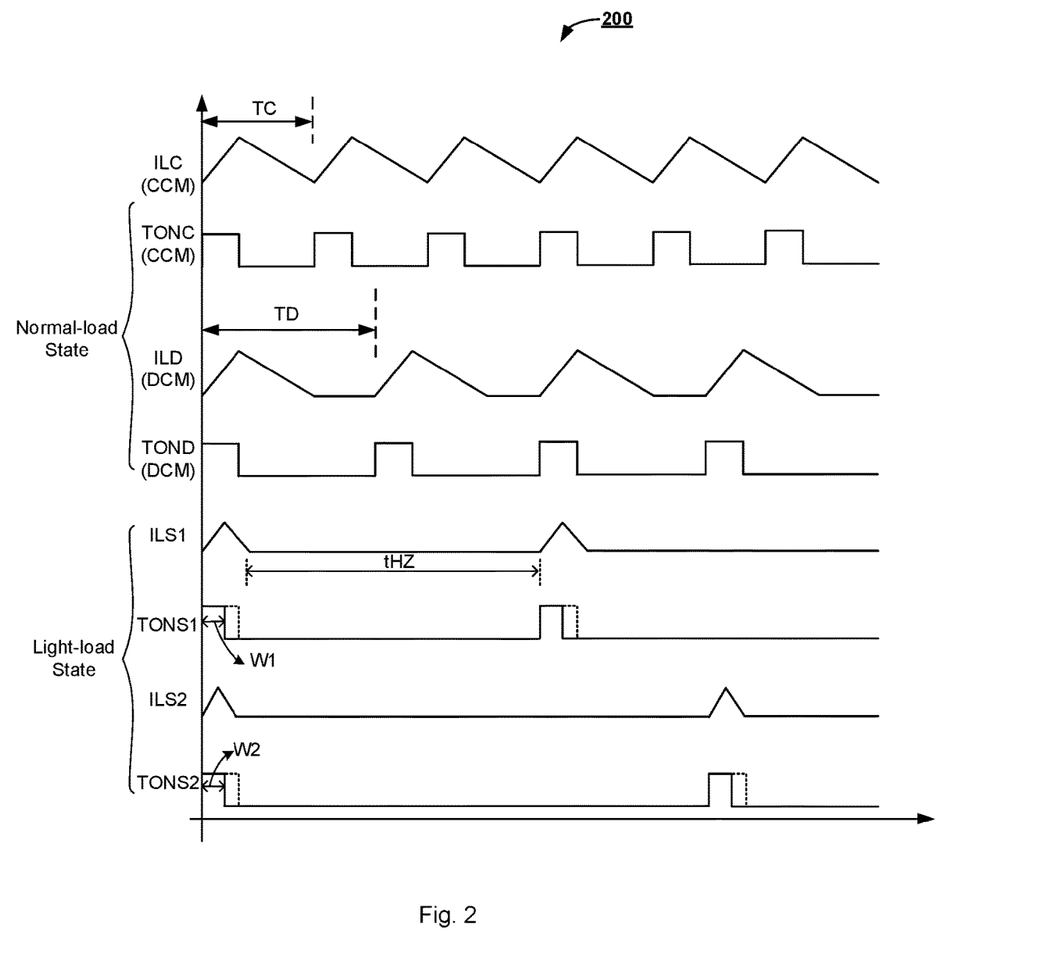
FIG. 2 illustrates working waveforms 200 of the switching converter 100 shown in FIG. 1 in accordance with an embodiment of the present invention.

FIG. 2 illustrates working waveforms 200 of the switching converter 100 shown in FIG. 1 in accordance with an embodiment of the present invention. In the example shown in FIG. 2, the signal waveforms 200 comprises the working waveforms of inductor current signals ILC, ILD, ILS1, ILS2, and on-time control signals TONC, TOND, TONS1, TONS2. Wherein the waveforms of ILC, TONC, ILD and TOND represent the waveforms when the switching converter 100 is in the normal-load steady state, including ILC and TONC at continuous current mode (CCM), and ILD and TOND at discontinuous current mode (DCM). The waveforms of ILS1, ILS2, TONS1, and TONS2 represent the waveforms when the switching converter 100 is in light-load steady state.

During the switching converter 100 is in the normal-load state including CCM and DCM, when the feedback voltage signal VFB is lower than the reference voltage signal VREF, the comparing signal TOFF changes from logic low into logic high, the control signal PWM turns on the high side switch HS and turns off the low side switch LS. The inductor current signal (i.e., ILC at CCM or ILD at DCM) increases linearly. After a constant on-time, the on-time control signal (i.e., TONC at CCM or TOND at DCM) turns off the high side switch HS and turns on the low side switch LS. Subsequently, the inductor current signal (i.e., ILC at CCM or ILD at DCM) decreases linearly. In CCM, when the inductor current signal ILC decreases to a minimum value, the high side switch HS is turned on again, so the inductor current signal ILC increases linearly, and a new cycle starts. In DCM, when the inductor current signal ILD decreases to zero, the high side switch HS keeps off until the end of the cycle. As shown in FIG. 2, when the switching converter 100 is in normal-load state including CCM or DCM, the pulse width of the on-time control signals TONC, TOND are equal, i.e., the on-time of the high side switch HS stays unchanged. The switching converter 100 changes the switching frequency based on the load change. For example, when the load becomes lighter, the switching converter 100 changes from CCM into DCM and the switching cycle changes from TC into TD.

According to an embodiment of the present invention, when the load continuous to become lighter, the switching converter 100 will enter the light-load state. In one embodiment, if the period the high side switch HS and the low side switch LS are both turned off exceeds a time threshold, e.g., the third time threshold tTH3, the switching converter 100 enters the light-load state. When the switching converter 100 is in the light-load state, the on-time control circuit 13 reduces the valid duration of the on-time control signal (e.g., TONS1 or TONS2) based on the light-load regulating current signal Ishr. In the example shown in FIG. 2, the valid duration of the on-time control signal can be reduced by reducing the pulse width of the on-time control signal, and thus the on-time of the power switch (e.g., the high side switch HS) is reduced. In the light-load state, reducing the on-time of the power switch can help reduce the output voltage ripple of the switching converter 100.

In the example shown in FIG. 2, when the switching converter 100 enters the light-load state, the pulse width W1 of the on-time control signal TONS1 and the pulse width W2 of the on-time control signal TONS2 are both smaller than the pulse width of the on-time control signals TONC and TOND in the normal-load state. In other words, the on-time of the power switch in the light-load state is smaller than the on-time of the power switch in the normal-load state. In addition, in the light-load state, the pulse width W1 of the on-time control signal TONS1 is equal to the pulse width W2 of the on-time control signal TONS2, i.e., in the light-load state, the on-time of the power switch in different steady states stays unchanged when the load changes.

Figure 3:
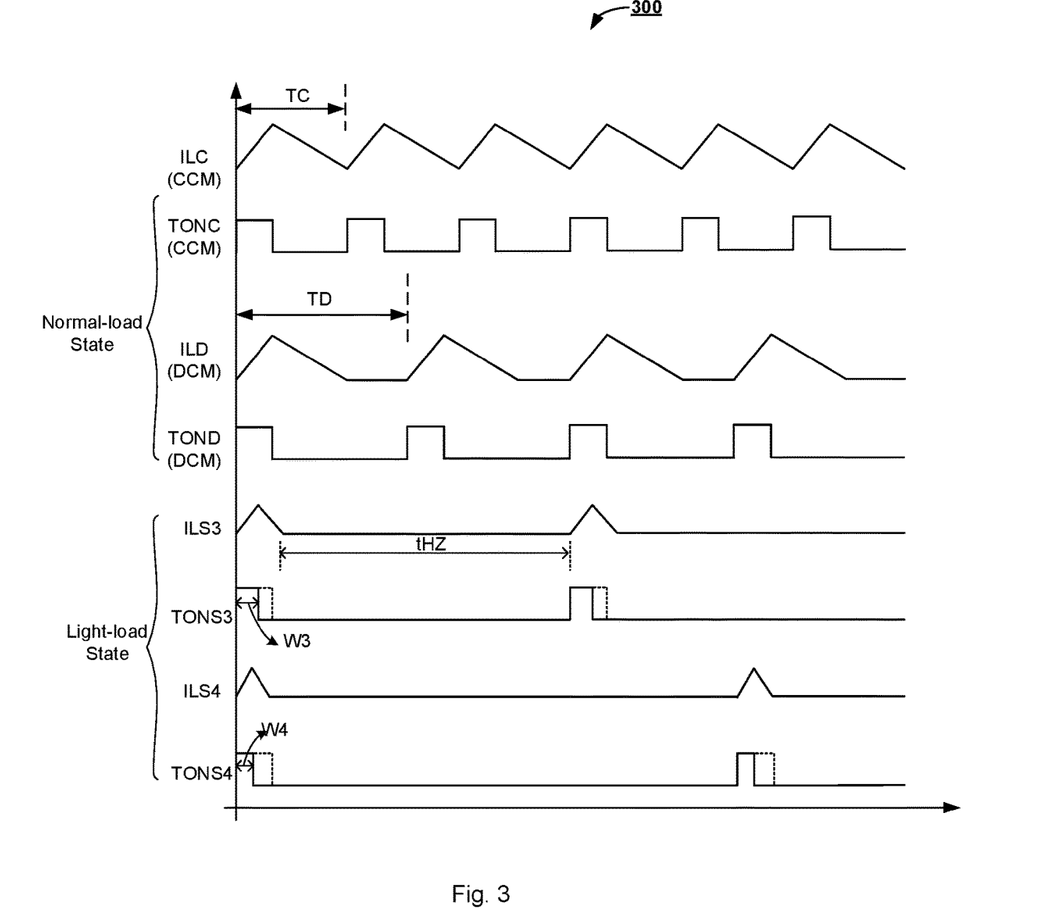
FIG. 3 illustrates working waveforms 300 of the switching converter 100 shown in FIG. 1 in accordance with another embodiment of the present invention.

FIG. 3 illustrates working waveforms 300 of the switching converter shown in FIG. 1 in accordance with another embodiment of the present invention. In the example shown in FIG. 3, the working waveforms 300 comprises the waveforms of inductor current signals ILC, ILD, ILS3, ILS4, and on-time control signals TONC, TOND, TONS3, TONS4. Wherein the waveforms of ILC, TONC, ILD and TOND represent the waveforms when the switching converter 100 is in the normal-load steady state including CCM and DCM; the waveforms of ILS3, ILS4, TONS3 and TONS4 represent the waveforms when the switching converter 100 is in the light-load steady state.

Different from the signal waveforms 200 shown in FIG. 2, the working waveforms 300 shown in FIG. 3 mainly illustrates the waveforms of the different on-time control signals TONS3 and TONS4. In the example shown in FIG. 3, when the switching converter 100 enters the light-load state, the pulse width W3 of the on-time control signal TONS3 and the pulse width W4 of the on-time control signal TONS4 are both smaller than the pulse widths of the on-time control signals TONC and TOND in the normal-load state. In addition, the average value of the inductor current signal ILS4 is lower than the average value of the inductor current signal ILS3, and the pulse width W4 of the on-time control signal TONS4 is smaller than the pulse width W3 of the on-time control signal TONS3. In other words, in the light-load state, the pulse width of the on-time control signal changes with load change, the lighter the load is, the smaller the pulse width of the on-time control signal is, and the smaller the on-time of the power switch is.

Figure 4:
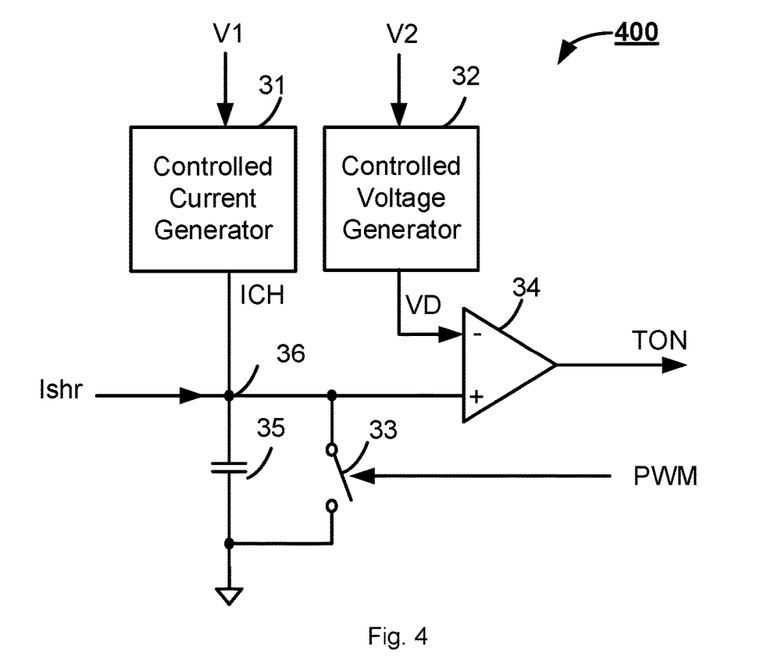
FIG. 4 illustrates a schematic diagram of an on-time control circuit 400 in accordance with an embodiment of the present invention.

FIG. 4 illustrates a schematic diagram of an on-time control circuit 400 in accordance with an embodiment of the present invention. As shown in FIG. 4, the on-time control circuit 400 comprises a controlled current generator 31, a controlled voltage generator 32, a reset switch 33, a voltage comparator 34, a capacitor 35 and a node 36. The controlled current generator 31 and the capacitor 35 are coupled in series between a first voltage signal V1 and a reference ground. The common node of the controlled current generator 31 and the capacitor 35 is labeled as the node 36. The controlled current generator 31 is configured to generate a controlled current signal ICH. The output terminal of the light-load regulating current generator 12 is coupled to the node 36 to provide the light-load regulating current signal Ishr. The reset switch 33 has a first terminal, a second terminal and a control terminal, wherein the first terminal is coupled to the node 36, the second terminal is coupled to the reference ground, and the control terminal receives the control signal PWM. In one embodiment, the control signal PWM comprises a high side control signal, when the high side control signal turns on the high side switch HS, the reset switch 33 is turned off, and the controlled current signal ICH charges the capacitor 35. The controlled voltage generator 32 receives a second voltage signal V2 and generates a controlled voltage signal VD. The voltage comparator 34 has a first input terminal, a second input terminal and an output terminal, wherein the first input terminal receives the controlled voltage signal VD, the second input terminal is coupled to the node 36 to receive a voltage across the capacitor 35. The voltage comparator 34 compares the controlled voltage signal VD and the voltage across the capacitor 35, and generates the on-time control signal TON.

In one embodiment, the first voltage signal V1 and the second voltage signal V2 can be configured to be constant values, so the controlled current signal ICH is a constant current, and the controlled voltage signal VD is also a constant voltage. When the switching converter 100 is in the normal-load state, the light-load regulating current signal Ishr is zero current, so whether in a transient state or a steady state, the duration of the on-time control signal TON at logic valid stays unchanged, and the switching converter 100 regulates the switching frequency with the load change. In one embodiment, the logic valid refers to the pulse width of the on-time control signal TON. When the switching converter 100 is in the light-load state, the light-load regulating current signal Ishr is not zero current, so the duration of the on-time control signal TON at logic valid will reduce, and the on-time of the power switch will also reduce.

In another embodiment, the first voltage signal V1 and the second voltage signal V2 can be configured to be variable values. For example, the first voltage signal V1 and the second voltage signal V2 are both variable with the input voltage VIN and the output voltage VOUT. When the switching converter 100 is in a normal-load transient state, the controlled current signal ICH and/or the controlled voltage signal VD will change with the input voltage VIN and the output voltage VOUT, so the duration of the on-time control signal TON at logic valid will change, too. When the switching converter 100 works in a normal-load steady state, the input voltage VIN and the output voltage VOUT stay unchanged, the controlled current signal ICH and/or the controlled voltage signal VD stay unchanged, so the duration of the on-time control signal TON at logic valid also stays unchanged. When the switching converter 100 is in the light-load state, the light-load regulating current signal Ishr is not zero current, so the duration of the on-time control signal TON at logic valid will reduce, and the on-time of the power switch will also reduce.

In one embodiment, when the first voltage signal V1 and the second voltage signal V2 are configured to be variable values which are related to the topology of the switching circuit 10. When the switching circuit 10 is configured to be a Buck topology, the duty cycle of the on-time control signal TON is proportional to the output voltage VOUT and inversely proportional to the input voltage VIN. In one embodiment, the first voltage signal V1 comprises the input voltage VIN, so the controlled current signal ICH is proportional to the input voltage VIN, and the second voltage signal V2 comprises the output voltage VOUT, so the controlled voltage signal VD is proportional to the output voltage VOUT.

When the switching circuit 10 is configured to be a Boost topology, the duty cycle of the on-time control signal TON is proportional to the difference between the output voltage VOUT and the input voltage VIN (i.e., VOUT-VIN), and inversely proportional to the output voltage VOUT. In one embodiment, the first voltage signal V1 comprises the output voltage VOUT, so the controlled current signal ICH is proportional to the output voltage VOUT, and the second voltage signal V2 comprises the input voltage VIN and the output voltage VOUT, so the controlled voltage signal VD is proportional to the difference between the output voltage VOUT and the input voltage VIN (i.e., VOUT-VIN).

Figure 5:
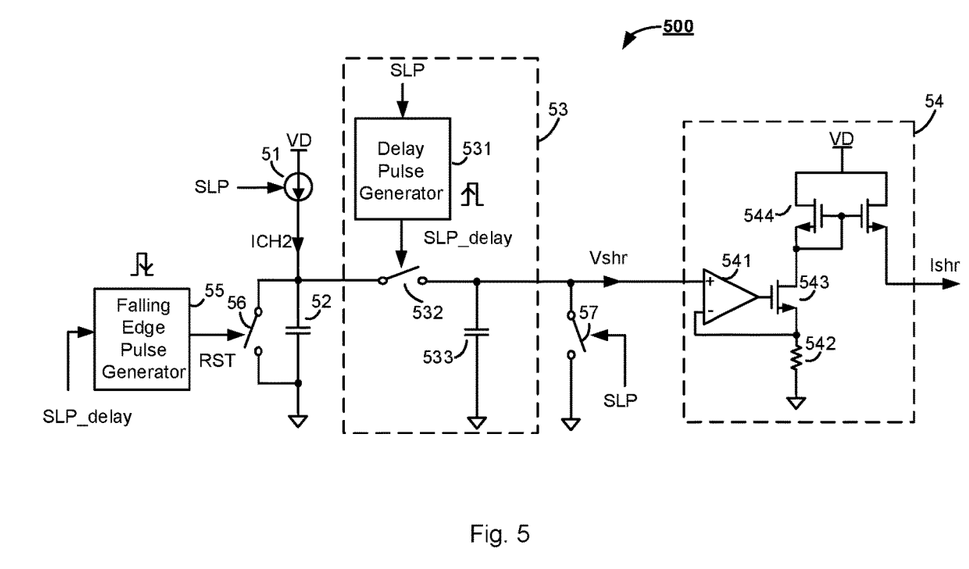
FIG. 5 illustrates a schematic diagram of a light-load regulating current generator 500 in accordance with one embodiment of the present invention.

FIG. 5 illustrates a schematic diagram of a light-load regulating current generator 500 in accordance with one embodiment of the present invention. As shown in FIG. 5, the light-load regulating current generator 500 comprises a current source 51, a capacitor 52, a sample-and-hold circuit 53 and a current converting circuit 54. The current source 51 has a first terminal, a second terminal and a control terminal, wherein the first terminal receives a supply voltage VDD, the second terminal provides a charging current signal ICH2, and the control terminal receives the state indication signal SLP. The capacitor 52 has a first terminal and a second terminal, wherein the first terminal is coupled to the second terminal of the current source 51, and the second terminal is coupled to a reference ground. When the switching converter 100 enters the light-load state, the state indication signal SLP controls the current source 51 to output the charging current signal ICH2 for charging the capacitor 52.

The sample-and-hold circuit 53 has an input terminal and an output terminal, wherein the input terminal is coupled to the common terminal of the current source 51 and the capacitor 52. After the current source 51 charging the capacitor 52 for a preset delay time, the sample-and-hold circuit 53 samples and holds a voltage across the capacitor 52, and provides a light-load regulating voltage signal Vshr at the output terminal. In one embodiment, when a rising edge of the state indication signal SLP comes, the sample-and-hold circuit 53 samples and holds the voltage across the capacitor 52 after the preset delay time. In one embodiment, the preset delay time can be programmed in advance, e.g., 5 ns.

The current converting circuit 54 has an input terminal and an output terminal, wherein the input terminal receives the light-load regulating voltage signal Vshr. The current converting circuit 54 converts the light-load regulating voltage signal Vshr into the light-load regulating current signal Ishr.

In the example shown in FIG. 5, the sample-and-hold circuit 53 comprises a delay pulse generator 531, a sampling switch 532 and a sampling capacitor 533. The delay pulse generator 531 receives the state indication signal SLP, and generates a sampling control signal SLP_delay after the state indication signal SLP is delayed for the preset delay time based on the state indication signal SLP. In one embodiment, the sampling control signal SLP_delay is a pulse signal. The sampling switch 532 has a first terminal, a second terminal and a control terminal, wherein the second terminal provides the light-load regulating voltage signal Vshr, and the control terminal receives the sampling control signal SLP_delay.

The sampling capacitor 533 is coupled between the second terminal of the sampling switch 532 and the reference ground. When the state indication signal SLP is delayed for the preset delay time, the sampling control signal SLP_delay turns on the sampling switch 532 at a rising edge of the sampling control signal SLP_delay, and the sampling capacitor 533 is charged. A voltage across the sampling capacitor 533 is provided as the light-load regulating voltage signal Vshr.

In the example shown in FIG. 5, the current converting circuit 54 comprises an operational amplifier 541, a resistor 542, a transistor 543 and a current mirror 544. The operational amplifier 541 has a first input terminal, a second input terminal and an output terminal, wherein the first input terminal receives the light-load regulating voltage signal Vshr, and the second input terminal is coupled to the reference ground through the resistor 542. The transistor 543 has a first terminal, a second terminal and a control terminal, wherein the first terminal is coupled to the second input terminal of the operational amplifier 541, and the control terminal is coupled to the output terminal of the operational amplifier 541. The current mirror 544 has an input terminal and an output terminal, wherein the input terminal is coupled to the second terminal of the transistor 543, and the output terminal provides the light-load regulating current signal Ishr.

In the example shown in FIG. 5, the light-load regulating current generator 500 further comprises a falling edge pulse generator 55, a sampling reset switch 56 and a light-load reset switch 57. The falling edge pulse generator 55 receives the sampling control signal SLP_delay and generates a sampling reset control signal RST at a falling edge of the sampling control signal SLP_delay. In one embodiment, the sampling reset control signal RST is a pulse signal.

The sampling reset switch 56 has a first terminal, a second terminal and a control terminal, wherein the first terminal is coupled to the first terminal of the capacitor 52, the second terminal is coupled to the second terminal of the capacitor 52, and the control terminal receives the sampling reset control signal RST.

The light-load reset switch 57 has a first terminal, a second terminal and a control terminal, wherein the first terminal is coupled to the output terminal of the sample-and-hold circuit 53, the second terminal is coupled to the reference ground, and the control terminal is configured to receive the state indication signal SLP.

In one embodiment, when the state indication signal SLP indicates the light-load state, the light-load reset switch 57 is turned off. When the state indication signal SLP indicates the normal-load state, the light-load reset switch 57 is turned on, and the light-load regulating voltage signal Vshr is clamped to the reference ground. In other embodiments, the light-load reset switch 57 can also be coupled between the output terminal of the current converting circuit 54 and the output terminal of the light-load regulating current generator 500. When the state indication signal SLP indicates the light-load state, the light-load reset switch 57 connects the output terminal of the current converting circuit 54 and the output terminal of the light-load regulating current generator 500. When the state indication signal SLP indicates the normal-load state, the light-load reset switch 57 disconnects the output terminal of the current converting circuit 54 and the output terminal of the light-load regulating current generator 500.

When the switching converter 100 is in the light-load state, the sampling reset switch 56 is turned off, the state indication signal SLP controls the current source 51 to output the charging current signal ICH2 for charging the capacitor 52. After the capacitor 52 is charged for a preset delay time, the sampling switch 532 is turned on, so the sampling capacitor 533 is charged. When the sampling switch 532 is turned off, the sampling reset switch 56 is turned on, and the capacitor 52 is discharged to reset. When the discharge of the capacitor 52 ends, the sampling reset switch 56 is turned off again, the charge current signal ICH2 recharges the capacitor 52, and a new cycle starts. In the example shown in FIG. 5, in the light-load state, the time of the capacitor 52 charged is same, so the light-load regulating voltage signal Vshr stays unchanged, and the light-load regulating current signal Ishr stays unchanged.

Figure 6:
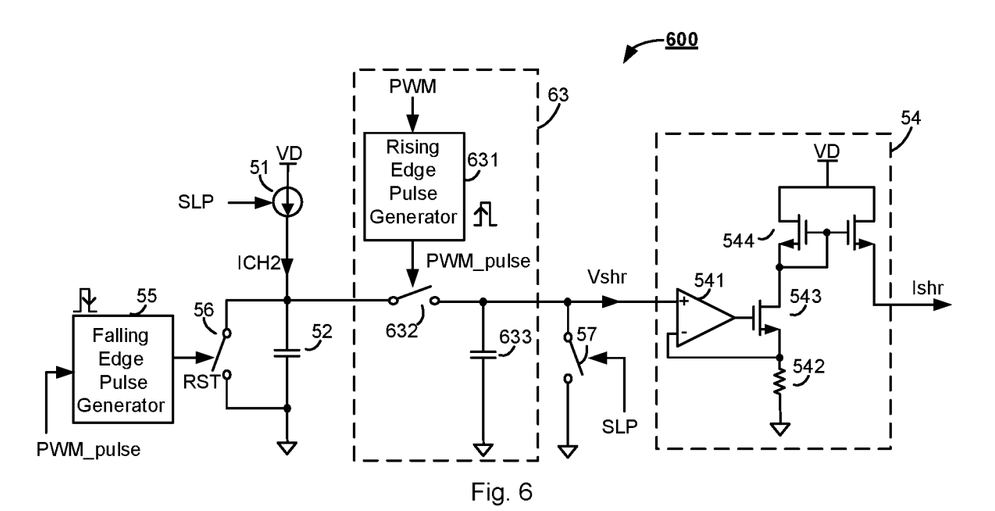
FIG. 6 illustrates a schematic diagram of a light-load regulating current generator 600 in accordance with another embodiment of the present invention.

FIG. 6 illustrates a schematic diagram of a light-load regulating current generator 600 in accordance with another embodiment of the present invention. In the example shown in FIG. 6, the light-load regulating current generator 600 comprises a current source 51, a capacitor 52, a sample-and-hold circuit 63 and a current converting circuit 54. Compared with the light-load regulating current generator 500 shown in FIG. 5, the sample-and-hold circuit 63 shown in FIG. 6 is different.

In the example shown in FIG. 6, the sample-and-hold circuit 63 comprises a rising edge pulse generator 631, a sampling switch 632 and a sampling capacitor 633. The rising edge pulse generator 631 receives the control signal PWM and generates a sampling control signal PWM_pulse at a rising edge of the control signal PWM. In one embodiment, the control signal PWM comprises a control signal for the high side switch HS. In another embodiment, the control signal PWM comprises a control signal for the low side switch LS. In one embodiment, the sampling control signal PWM_pulse is a pulse signal.

The sampling switch 632 has a first terminal, a second terminal and a control terminal, wherein the second terminal is configured to provide the light-load regulating voltage signal Vshr, and the control terminal is configured to receive the sampling control signal PWM_pulse.

The sampling capacitor 633 has a first terminal and a second terminal, wherein the first terminal is coupled to the second terminal of the sampling switch 632, and the second terminal is coupled to the reference ground. At a rising edge of the control signal PWM, the sampling control signal PWM_pulse turns on the sampling switch 632 and the sampling capacitor 633 is charged, wherein a voltage across the sampling capacitor 633 is provided as the light-load regulating voltage signal Vshr. When the switching converter 100 is in the light-load state, the sampling reset switch 56 is turned off, the state indication signal SLP controls the current source 51 to output the charging current signal ICH2 for charging the capacitor 52. When a rising edge of the control PWM comes, the sampling switch 632 is turned on, and the sampling capacitor 633 is charged. After the sampling switch 632 is turned off, the sampling reset switch 56 is turned on, and the capacitor 52 is discharged to reset. When the discharge of the capacitor 52 ends, the sampling reset switch 56 is turned off again, the charging current signal ICH2 charges the capacitor 52, and a new cycle starts. In the example shown in FIG. 6, when the switching converter is in the light-load state, the time when a rising edge of the control signal PWM comes is different since the load is different, the light-load regulating voltage signal Vshr is different and the light-load regulating current signal Ishr is also different.

In the example shown in FIG. 6, the light-load regulating current generator 600 further comprises a falling edge pulse generator 55, a sampling reset switch 56 and the light-load reset switch 57. Different from the light-load regulating current generator 500 shown in FIG. 5, the falling edge generator 56 receives the sampling control signal PWM_pulse and generates the sampling reset control signal RST at a falling edge of the sampling control signal PWM_pulse.

Figure 7:
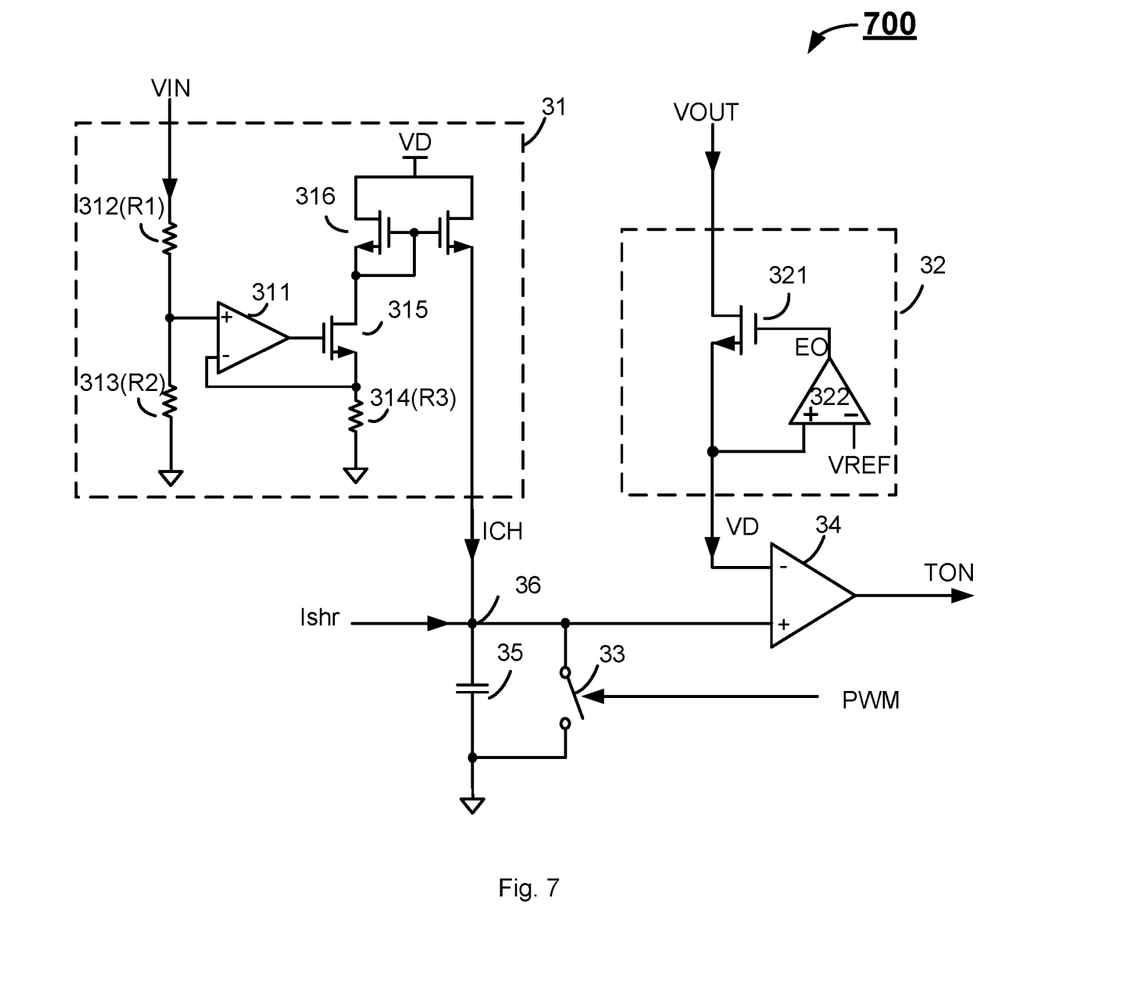
FIG. 7 illustrates a schematic diagram of an on-time control circuit 700 in accordance with one embodiment of the present invention.

FIG. 7 illustrates a schematic diagram of an on-time control circuit 700 in accordance with one embodiment of the present invention. Specifically, the example shown in FIG. 7 illustrates the detailed circuit architecture of the controlled current generator 31 and the controlled voltage generator 32 when the switching circuit 10 is configured as a Buck topology.

As shown in FIG. 7, the controlled current generator 31 comprises an operational amplifier 311, a resistor 312 with resistance R1, a resistor 313 with resistance R2, a resistor 314 with resistance R3, a transistor 315 and a current mirror 316. The operational amplifier 311 has a first input terminal, a second input terminal and an output terminal, wherein the first input terminal is coupled to a common terminal of the resistor 312 and resistor 313 to receive the input voltage VIN, and the second input terminal is coupled to a common terminal of the resistor 314 and the transistor 315. The transistor 315 has a first terminal, a second terminal and a control terminal, wherein the first terminal is coupled to the second input terminal of the operational amplifier 311, and the control terminal is coupled to the output terminal of the operational amplifier 311. The current mirror 316 has an input terminal and an output terminal, wherein the input terminal is coupled to the second terminal of the transistor 315, and the output terminal provides the controlled current signal ICH, wherein $ICH = VIN \times R2/((R1+R2) \times R3)$.

In the example shown in FIG. 7, the controlled voltage generator 32 comprises a transistor 321 and an error amplifier 322. The transistor 321 has a first terminal, a second terminal and a control terminal, wherein the first terminal receives the output voltage VOUT and the second terminal provides the controlled voltage signal VD. The error amplifier 322 has a first input terminal, a second input terminal and an output terminal, wherein the first input terminal receives the reference voltage signal VREF, the second input terminal is coupled to the second terminal of the transistor 321 to receive the controlled voltage signal VD, and the output terminal is coupled to the control terminal of the transistor 321. The error simplifier 322 is configured to amplify the difference between the reference voltage signal VREF and the controlled voltage signal VD, and provide an error signal EO for controlling the transistor 321 to work in a linear area.

Figure 8:
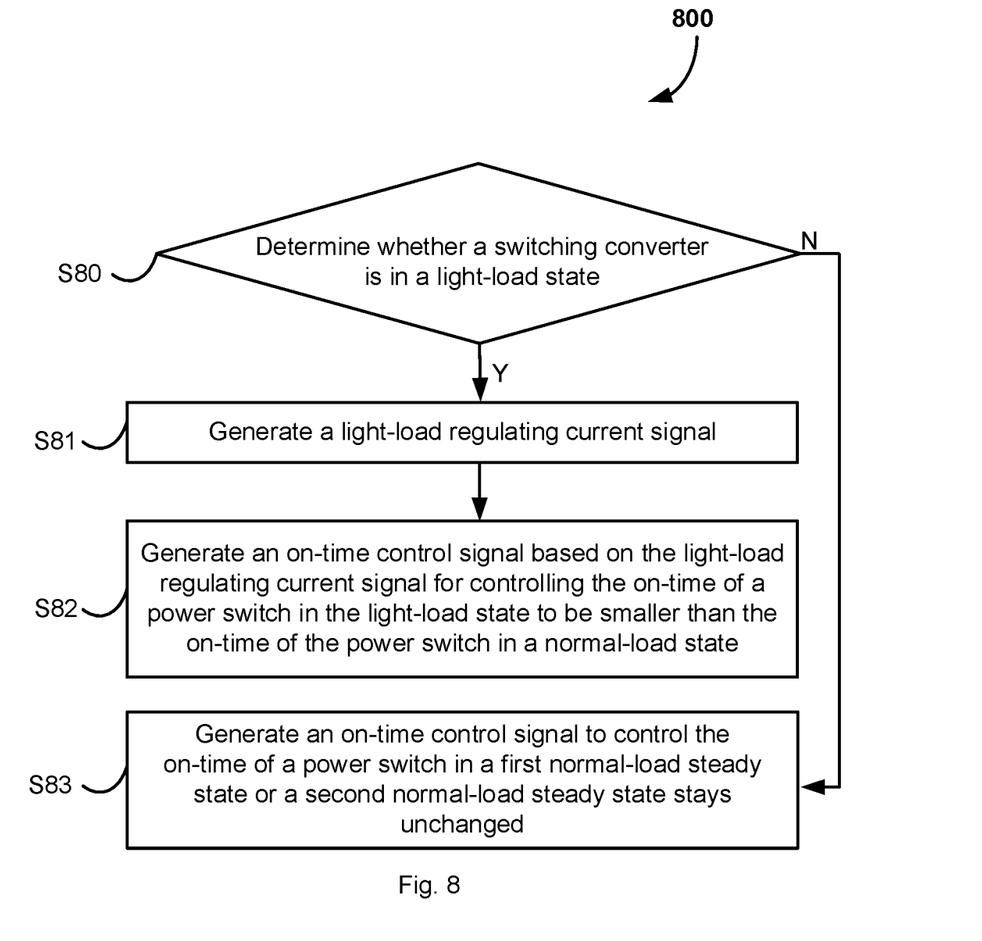
FIG. 8 illustrates a flow chart of a control method 800 used in a switching converter with adaptive constant on-time control in accordance with an embodiment of the present invention.

FIG. 8 illustrates a flow chart of a control method 800 used in a switching converter with adaptive constant on-time control in accordance with an embodiment of the present invention. The adaptive constant on-time control method can be used in the switching converters shown in FIG. 1-FIG. 7 and those within the scope of the appended claims. The control method includes steps S80-S83.

At step S80, whether a switching converter is in a light-load state is determined. If the switching converter is in the light-load state, the process will go to the step S81. Otherwise, the process will go to the step S83.

At step S81, when the switching converter is in the light-load state, a light-load regulating current signal is generated.

At step S82, when the switching converter is in the light-load state, an on-time control signal is generated based on the light-load regulating current signal. Wherein based on the on-time control signal, the on-time of a power switch in the light-load state is configured to be smaller than the on-time of the power switch in the normal-load state. In one embodiment, when the switching converter is in the light-load state, the on-time of the power switch in a first light-load steady state or a second light-load steady state is constant and equal. In another embodiment, when the switching converter is in the light-load state, the on-time of the power switch in the first light-load steady state or the second light-load steady state changes with the load change.

At step S83, when the switching converter is in a normal-load state, the on-time of the power switch in a first normal-load steady state or a second normal-load steady state stays unchanged. In one embodiment, a control circuit of the switching converter generates an on-time control signal based on an input voltage VIN and an output voltage VOUT. In another embodiment, the control circuit generates the on-time control signal based on a constant voltage signal.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit used in a switching converter, wherein the switching converter has a power switch and converts an input voltage into an output voltage, the control circuit comprising:
a light-load regulating current generator configured to receive a state indication signal indicative of a light-load state and generate a light-load regulating current signal based on the state indication signal;
an on-time control circuit configured to receive the light-load regulating current signal and generate an on-time control signal based on the light-load regulating current signal, wherein based on the on-time control signal, the on-time of the power switch in the light-load state is controlled to be smaller than the on-time of the power switch in a normal-load state;
a comparing circuit configured to receive a feedback voltage signal indicative of the output voltage and a reference voltage signal, and generate a comparing signal based on the feedback voltage signal and the reference voltage signal; and
a logic circuit configured to receive the comparing signal and the on-time control signal, and generate a switch control signal to control the power switch based on the comparing signal and the on-time control signal;
wherein the light-load regulating current generator comprises:
a current source having a first terminal, a second terminal and a control terminal, wherein the first terminal receives a supply voltage and the control terminal receives the state indication signal;
a first capacitor having a first terminal and a second terminal, wherein the first terminal is coupled to the second terminal of the current source, and the second terminal is coupled to a reference ground;
a sample-and-hold circuit having an input terminal and an output terminal, wherein the input terminal is coupled to the second terminal of the current source and the first terminal of the first capacitor, the sample-and-hold circuit is configured to sample and hold a voltage across the first capacitor and provide a light-load regulating voltage signal; and
a current converting circuit configured to receive the light-load regulating voltage signal and convert the light-load regulating voltage signal into the light-load regulating current signal.

2. The control circuit of claim 1, wherein the light-load regulating current signal is a constant current when the state indication signal indicates that the switching converter is in the light-load state.

3. The control circuit of claim 1, wherein the light-load regulating current signal changes with load change.

4. The control circuit of claim 1, wherein the normal-load state comprises a continuous current mode (CCM) or a discontinuous current mode (DCM).

5. The control circuit of claim 4, wherein the on-time control circuit comprises:
a controlled current generator configured to receive a first voltage signal and generate a controlled current signal based on the first voltage signal;
a second capacitor having a first terminal and a second terminal, wherein the first terminal is coupled to the controlled current generator and the light-load regulating current generator, the second terminal is coupled to a reference ground;
a reset switch having a first terminal, a second terminal and a control terminal, wherein the first terminal is coupled to the first terminal of the second capacitor, the second terminal is coupled to the reference ground, and the control terminal is configured to receive the switch control signal;
a controlled voltage generator configured to receive a second voltage signal and generate a controlled voltage signal based on the second voltage signal; and
a voltage comparator having a first input terminal, a second input terminal and an output terminal, wherein the first input terminal is configured to receive the controlled voltage signal, and the second input terminal is coupled to the first terminal of the second capacitor, the voltage comparator is configured to compare the controlled voltage signal with a voltage across the second capacitor and provide the on-time control signal.

6. The control circuit of claim 1, wherein after the current source charging the first capacitor for a preset delay time, the sample-and-hold circuit samples and holds the voltage across the first capacitor and provides the light-load regulating voltage signal.

7. The control circuit of claim 6, wherein the sample-and-hold circuit comprises:
a delay pulse generator configured to receive the state indication signal, and based on the state indication signal, the delay pulse generator generates a first sampling control signal after the preset delay time;
a first sampling switch having a first terminal, a second terminal and a control terminal, wherein the first terminal is coupled to the second terminal of the current source and the first terminal of the first capacitor, the second terminal is configured to provide the light-load regulating voltage signal, and the control terminal is configured to receive the first sampling control signal; and
a first sampling capacitor coupled between the second terminal of the first sampling switch and the reference ground.

8. The control circuit of claim 7, wherein the light-load regulating current generator further comprises:
a first falling edge pulse generator configured to receive the first sampling control signal and generate a first sampling reset control signal based on the first sampling control signal;
a first sampling reset switch having a first terminal, a second terminal and a control terminal, wherein the first terminal is coupled to the first terminal of the first capacitor, the second terminal is coupled to the second terminal of the first capacitor, and the control terminal is configured to receive the first sampling reset control signal; and
a first light-load reset switch having a first terminal, a second terminal and a control terminal, wherein the first terminal is coupled to the output terminal of the sample- and-hold circuit, the second terminal is coupled to the reference ground, and the control terminal is configured to receive the state indication signal.

9. The control circuit of claim 1, wherein when the power switch is turned on, the sample-and-hold circuit samples and holds the voltage across the first capacitor and provides the light-load regulating voltage signal.

10. The control circuit of claim 9, wherein the sample-and-hold circuit comprises:
a rising edge pulse generator configured to receive the switch control signal and generate a second sampling control signal based on the switch control signal;
a second sampling switch having a first terminal, a second terminal and a control terminal, wherein the first terminal is coupled to the second terminal of the current source and the first terminal of the first capacitor, the second terminal is configured to provide the light-load regulating voltage signal, and the control terminal is configured to receive the second sampling control signal; and
a second sampling capacitor coupled between the second terminal of the second sampling switch and the reference ground.

11. The control circuit of claim 10, wherein the light-load regulating current generator further comprises:
a second falling edge pulse generator configured to receive the second sampling control signal and generate a second sampling reset control signal based on the second sampling control signal;
a second sampling reset switch having a first terminal, a second terminal and a control terminal, wherein the first terminal is coupled to the first terminal of the first capacitor, the second terminal is coupled to the second terminal of the first capacitor, and the control terminal is configured to receive the second sampling reset control signal; and
a second light-load reset switch having a first terminal, a second terminal and a control terminal, wherein the first terminal is coupled to the output terminal of the sample- and-hold circuit, the second terminal is coupled to the reference ground, and the control terminal is configured to receive the state indication signal.

12. A switching converter, comprising:
a switching circuit having a power switch and configured to convert an input voltage into an output voltage;
a feedback circuit coupled to the switching circuit and configured to provide a feedback voltage signal indicative of the output voltage;
a light-load regulating current generator configured to receive a state indication signal indicative of a light-load state and generate a light-load regulating current signal based on the state indication signal;
an on-time control circuit configured to receive the light-load regulating current signal and generate an on-time control signal based on the light-load regulating current signal, wherein based on the on-time control signal, the on-time of the power switch in the light-load state is controlled to be smaller than the on-time of the power switch in a normal-load state;
a comparing circuit configured to receive the feedback voltage signal and a reference voltage signal, and generate a comparing signal based on the feedback voltage signal and the reference voltage signal; and
a logic circuit configured to receive the comparing signal and the on-time control signal, and generate a switch control signal to control the power switch based on the comparing signal and the on-time control signal;
wherein the normal-load state comprises a continuous current mode (CCM) or a discontinuous current mode (DCM); and
wherein the light-load regulating current generator comprises:
a current source having a first terminal, a second terminal and a control terminal, wherein the first terminal receives a supply voltage and the control terminal receives the state indication signal;
a first capacitor having a first terminal and a second terminal, wherein the first terminal is coupled to the second terminal of the current source, and the second terminal is coupled to a reference ground;
a sample-and-hold circuit having an input terminal and an output terminal, wherein the input terminal is coupled to the second terminal of the current source and the first terminal of the first capacitor, the sample-and-hold circuit is configured to sample and hold a voltage across the first capacitor and provide a light-load regulating voltage signal; and
a current converting circuit configured to receive the light-load regulating voltage signal and convert the light-load regulating voltage signal into the light-load regulating current signal.

13. The switching converter of claim 12, wherein the light-load regulating current signal is a constant current when the state indication signal indicates that the switching converter is in the light-load state.

14. The switching converter of claim 12, wherein the light-load regulating current signal changes with load change.

15. The switching converter of claim 12, wherein after the current source charging the first capacitor for a preset delay time, the sample-and-hold circuit samples and holds the voltage across the first capacitor and provides the light-load regulating voltage signal.

16. The switching converter of claim 12, wherein when the power switch is turned on, the sample-and-hold circuit samples and holds the voltage across the first capacitor and provides the light-load regulating voltage signal.

17. The switching converter of claim 12, wherein the on-time control circuit comprises:
   a controlled current generator configured to receive a first voltage signal and generate a controlled current signal based on the first voltage signal;
   a second capacitor having a first terminal and a second terminal, wherein the first terminal is coupled to the controlled current generator and the light-load regulating current generator, the second terminal is coupled to a reference ground;
   a reset switch having a first terminal, a second terminal and a control terminal, wherein the first terminal is coupled to the first terminal of the second capacitor, the second terminal is coupled to the reference ground, and the control terminal is configured to receive the switch control signal;
   a controlled voltage generator configured to receive a second voltage signal and generate a controlled voltage signal based on the second voltage signal; and
   a voltage comparator having a first input terminal, a second input terminal and an output terminal, wherein the first input terminal is configured to receive the controlled voltage signal, and the second input terminal is coupled to the first terminal of the second capacitor, the voltage comparator is configured to compare the controlled voltage signal with a voltage across the second capacitor and provide the on-time control signal.

* * * * *